(12) United States Patent
Murphy (10) Patent No.: US 6,873,282 B1
(45) Date of Patent: Mar. 29, 2005

(54) DIFFERENTIAL TIME-TO-THRESHOLD A/D CONVERSION IN DIGITAL IMAGING ARRAYS

(76) Inventor: Charles Douglas Murphy, 601 Linden Pl., #210, Evanston, IL (US) 60202

( * ) Notice: Subject to any disclaimer, the term of this patent is extended or adjusted under 35 U.S.C. 154(b) by 0 days.

(21) Appl. No.: 10/792,466

(22) Filed: Mar. 4, 2004

(51) Int. Cl.[7] .................................................. H03M 1/34
(52) U.S. Cl. ....................................... 341/164; 341/166
(58) Field of Search ................................ 341/164, 166, 341/110, 111, 118, 120, 137, 140, 141, 155, 161, 177, 185

(56) References Cited

U.S. PATENT DOCUMENTS

| | | | |
|---|---|---|---|
| 5,461,425 A | | 10/1995 | Fowler et al. |
| 5,479,208 A | | 12/1995 | Okumura |
| 5,650,643 A | * | 7/1997 | Konuma ..................... 257/225 |
| 6,069,377 A | | 5/2000 | Prentice et al. |
| 6,166,367 A | * | 12/2000 | Cho ......................... 250/208.1 |
| 6,201,572 B1 | * | 3/2001 | Chou ......................... 348/241 |
| 6,248,991 B1 | | 6/2001 | Chen et al. |
| 6,297,761 B1 | * | 10/2001 | Barrenscheen et al. ..... 341/166 |
| 6,307,195 B1 | * | 10/2001 | Guidash ................... 250/208.1 |
| 6,330,030 B1 | * | 12/2001 | O'Connor ................... 348/297 |
| 6,552,745 B1 | | 4/2003 | Perner |
| 6,559,788 B1 | | 5/2003 | Murphy |
| 6,587,145 B1 | | 7/2003 | Hou |
| 6,642,503 B2 | | 11/2003 | Kummaraguntla et al. |
| 6,680,498 B2 | | 1/2004 | Guidash |
| 6,801,146 B2 | * | 10/2004 | Kernahan et al. ........... 341/122 |

OTHER PUBLICATIONS

Filfactory FAQ page "About Correlated Double Sampling" (URL is http://www.fillfactory.com/htm/cds.htm), (2004).

* cited by examiner

Primary Examiner—Michael Tokar
Assistant Examiner—Linh V Nguyen (57) ABSTRACT

Differential measurements allow correction of fixed-pattern noise errors in digital imaging arrays which use time-to-threshold A/D conversion techniques. Two time-to-threshold measurements are made with the same sensor and threshold-detecting circuitry. The measurements are made in quick succession so that the amount of incident energy is substantially unchanged. However, the two measurements use differing initial sensor output levels or threshold levels. The difference between the two measurements then reflects the time required for each sensor output signal to change by an amount equal to the difference between the initial sensor output values or the threshold values. Repeatable noise terms are cancelled in the computed difference measurement.

22 Claims, 6 Drawing Sheets

Figure 4

DIFFERENTIAL TIME-TO-THRESHOLD A/D CONVERSION IN DIGITAL IMAGING ARRAYS

CROSS-REFERENCE TO RELATED APPLICATIONS

The application is related to COMPARING CIRCUITS FOR TIME-TO-THRESHOLD A/D CONVERISON IN DIGITAL IMAGING ARRAYS filed by the applicant.

STATEMENT REGARDING FEDERALLY SPONSORED RESEARCH OR DEVELOPMENT

Not applicable

REFERENCE TO A MICROFICHE APPENDIX

Not applicable

BACKGROUND

1. Field of Invention

The invention relates to digital imaging using time-to-threshold A/D conversion, particularly to elimination of measurement errors due to different cells having mismatched components and being exposed to differing amounts of incident energy.

2. Description of Prior Art

Time-to-threshold A/D conversion in digital imaging is well-known in the prior art. The approach is most useful in very large (by sensor count) imaging arrays with analog, mixed-signal, and digital logic circuits incorporated onto a single chip. The dominant technology for such systems is CMOS, a popular fabrication process that is widely used to make digital chips such as microprocessors and memories.

Previously, A/D conversion in digital imaging was substantially independent of the imaging process. Sensors in an array would be exposed to incident energy simultaneously, for a given common exposure time. Then, each sensor output signal would be passed out of the array to a separate general-purpose A/D converter.

However, in time-to-threshold A/D conversion, elapsed time is tracked during exposure. When a sensor output signal reaches a threshold level, the elapsed time since the start of exposure is taken as the digital representation of the analog sensor output response.

Sports analogies are useful in understanding the difference. Prior art array-external A/D conversion with general purpose A/D converters is similar to a fixed-time race such as the "24 Hours of Le Mans". The digital measurement is of how far the sensor output signal goes in a fixed amount of time.

On the other hand, time-to-threshold A/D conversion is similar to a fixed-distance race such as a 100 meter sprint. The digital measurement is of how much time is required to go from start to finish.

Several U.S. patents describe various types of time-to-threshold A/D conversion for digital imaging, including U.S. Pat. No. 5,650,643 issued to K. Konuma, U.S. Pat. No. 6,587,145 issued to A. Hou, and U.S. Pat. No. 6,559,788 issued to C. Murphy. U.S. Pat. No. 5,461,425 issued to B. Fowler and A. El Gamal describes an early proposal for putting A/D converters in an imaging array as a way of avoiding having to pass analog signals to array-external A/D converters.

The advantages and disadvantages of some of these patents are described in U.S. Pat. No. 6,680,498 issued to R. Guidash. U.S. Pat. No. 6,680,498 also discusses several prior art methods that use multiple images or variants of standard imaging techniques to enhance the performance of digital imaging systems, notably the work of O. Yadid-Pecht and his colleagues presented at the 1997 IEEE Workshop on Charge-Coupled Devices and Advanced Image Sensors.

Notwithstanding, none of the prior art on time-to-threshold A/D conversion in digital imaging takes into account the undesirable effects known as fixed-pattern noise (FPN).

FPN typically refers to static or slowly-changing variations in the behavior of different sensor cells in an array. In most systems, these variations are largely independent of differences in incident energy at the sensors. Rather, they depend on component mismatch. Component parameter mismatch can result from manufacturing or age effects. In CMOS, many circuit parameters depend on size ratios—for instance, transistor gains are functions of channel width-to-length ratios—so that size errors lead to component mismatch.

FPN is a particular problem in high-precision imaging systems, as the "noise" pattern may be much stronger than the weak incident energy variations which such systems aim to detect.

In prior art CMOS image sensor arrays with a predetermined common exposure time followed by A/D conversion, FPN can be eliminated using so-called "double-sampling" (DS) or "correlated double sampling" (CDS).

With DS, a reference "dark" measurement is taken, as well as a post-exposure "light" measurement. The "light" measurement includes the effects of incident energy during exposure, whereas the "dark" measurement does not. With CDS, a first measurement of a sensor output is taken after sensor initialization but before exposure, and a second measurement is taken after exposure.

In both DS and CDS, computing a difference between two measurements for the same sensor allows cancellation of any common terms. For CDS, fixed-pattern errors and initialization errors are substantially cancelled, whereas in DS only fixed-pattern errors are corrected. Initialization errors can occur when the pre-initialization state of a sensor affects the actual state reached during the finite initialization time.

DS and CDS can be implemented digitally after A/D conversion of measured sensor outputs, or via storage of an analog first measurement followed by analog subtraction of a second measurement prior to A/D conversion.

Both DS and CDS effectively implement subtraction of a noise-only measurement from a noise-plus-signal measurement in order to obtain a signal-only measurement. Insofar as "noise" is repeatable, such a differential measurement technique is a simple yet elegant solution to the problem of signal extraction.

Imaging systems with time-to-threshold A/D conversion may suffer from both FPN and input-dependent (i.e. incident energy dependent) errors. Slow comparing circuits may provide a suitable digital indicator signal with some delay. The amount of delay may depend on the strength of the comparing circuit input. A strong input may quickly exceed the threshold level and so over-drive the comparing circuit, resulting in a short delay. A weak input signal may hover near the threshold level and so not over-drive the comparing circuit as much, resulting in a longer delay.

Time-to-threshold A/D conversion in digital imaging offers the possibility of high-precision imaging at low cost, but the prior art has so far neglected removal of FPN and input-dependent delay errors.

SUMMARY

The present invention is a differential measurement approach for time-to-threshold A/D conversion in digital imaging systems, particularly in CMOS image sensor arrays.

OBJECTS AND OBJECTIVES

There are several objects and objectives of the present invention.

It is an object of the present invention to provide a simple approach to eliminating certain types of fixed-pattern noise in digital imaging systems that use time-to-threshold techniques for A/D conversion.

It is an object of the present invention to enable high-precision low-speed, low-precision high-speed, and high-precision high-speed time-to-threshold A/D conversion for digital imaging.

It is another object of the present invention to shift the performance burden in high-precision time-to-threshold A/D conversion for digital imaging from precise component matching in large numbers of sensors and simple comparing circuits to precise matching of a small number of reference signal levels.

It is still another object of the present invention to enable high-speed differential measurements using relatively low-speed comparing circuits.

Further objects and advantages of the invention will become apparent from a consideration of the ensuing description.

REFERENCE NUMERALS IN DRAWINGS 10 a photodiode
12 a power supply ground
14 a reset transistor
16 a positive power supply rail
18 an amplifying transistor
20 a bus access transistor
22 an analog signal bus
24 a threshold detector
26 a digital indicator output
28 a first sensor
30 a first threshold detector
32 an initial sensor output reference
34 a first digital memory
36 a second digital memory
38 a digital counter
40 a subtractor
42 a reference reset voltage bus
44 a first sensor cell
46 a second sensor cell
48 a power supply
50 a reference source
52 a row line conditioner
54 a counter
56 a column line conditioner
58 subtractors and memory
60 outer array boundary
62 first sensor output level
64 first initial signal level
66 nominal threshold level
68 first actual threshold level
70 first sensor first elapsed time
72 second initial signal level
74 first sensor second elapsed time
76 first delay term
78 second sensor output level
80 second actual threshold level
82 second sensor first elapsed time
84 second sensor second elapsed time
86 second delay term Description—The Preferred Embodiment of the Invention In the preferred embodiment of the invention, a first time-to-threshold conversion measurement and a second time-to-threshold conversion measurement are acquired using a first sensor and a first threshold-detecting circuit, but different initial sensor output values.

Figure 1A:
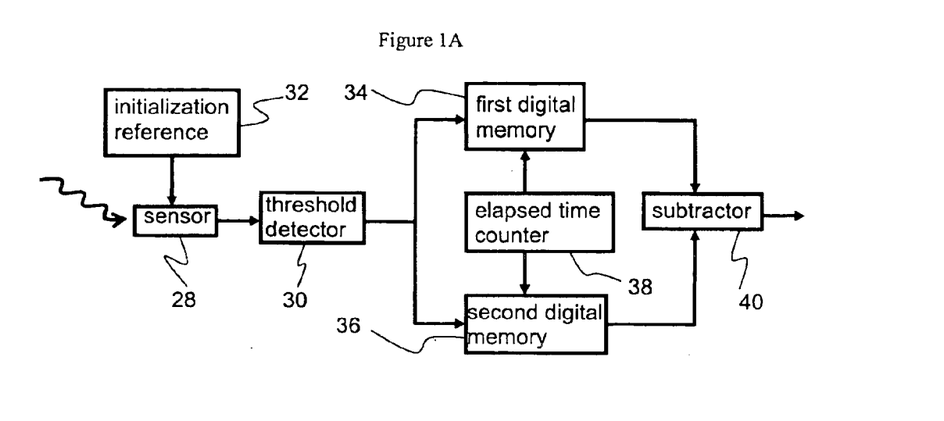
FIG. 1A shows a block diagram of the preferred embodiment of the invention.

FIG. 1A shows a block diagram of a system for the preferred embodiment of the invention. First sensor 28 is connected to first threshold detector 30. For the first time-to-threshold measurement, first sensor 28 is initialized to a first initial output value on the basis of a reference signal supplied by initial sensor output reference 32.

The output of first threshold detector 30 is a digital indicator signal. It is passed to first digital memory 34 during the first measurement. First digital memory 34 records a first digital count value provided by digital counter 38 when the output of first threshold detector 30 indicates the threshold has been reached.

For the second measurement, the output of first sensor 28 is initialized to a second initial sensor output value which is different than the first initial sensor output value. Again, initial sensor output reference 32 provides a reference signal to first sensor 28.

The output of first threshold detector 30 is passed to second digital memory 36. During the second measurement, second digital memory 36 records a second digital count value, again provided by digital counter 38.

Finally, first digital memory 34 and second digital memory 38 pass their respective recorded digital count values to subtractor 40, which computes the difference.

The first time-to-threshold measurement and the second time-to-threshold measurement are taken in quick succession, so that the incident energy at first sensor 28 is approximately the same during both measurements. Since the same circuits are used in both cases for sensing and threshold detection, both measurements include the same fixed-pattern noise component. Both measurements also include the same input-dependent delay.

Thus, the difference computed by subtractor 40 is substantially free of both FPN and input-dependent delay errors.

Description—Motivation

It is common practice in the prior art of digital imaging to use sensor cells configured as integrators. The sensor output level change is proportional to the cumulative incident energy.

It is impossible to recover the driving incident energy signal from the integral sensor output level change. However, in many practical situations the amount of incident energy is approximately constant over short time intervals.

Time-to-threshold A/D conversion and the differential variety in the present invention are based on this model of approximate constancy.

The idea can be described using simple equations.

Let $Vo(t,k)$ be the initial sensor output value of sensor k at discrete time index t and let $Vf(t,k)$ be the threshold level of sensor k at time t. Furthermore, let $Tm(t,k)$ be the measured time required for the output value of sensor k to change from $Vo(t,k)$ to $Vf(t,k)$ during time epoch t. The average rate-of-change of sensor k during time t, $M(t,k)$, is related to the other three quantities according to equation (1).

$$Vf(t,k) = M(t,k) * Tm(t,k) + Vo(t,k) \quad (1)$$

Equation (1) is easily recognized as a linear function, and can be rewritten in terms of $M(t,k)$, as shown in equation (2).

$$Tm(T,k) = (Vf(t,k) - Vo(t,k))/M(t,k) \quad (2)$$

In time-to-threshold A/D conversion, the measured times are proportional to the reciprocal of the average rate-of-change. A set of single time measurements $\{Tm(t,k)\}$ for all k values can form a digital image acquired by a sensor array.

However, if $(Vf(t,k) - Vo(t,k))$ is not the same for all k values, there will be fixed-pattern noise. Threshold detectors with different actual threshold levels can result in $Vf(t,k)$ varying with k.

Now consider a second measurement $Tm(t+1,k)$ for the same sensor k at discrete time index $(t+1)$.

$$Tm(t+1,k) = (Vf(t+1,k) - Vo(t+1,k))/M(t+1,k) \quad (3)$$

If $M(t,k)$ is approximately the same as $M(t+1,k)$, then the difference between the two measured times $Tm(t+1,k)$ and $Tm(t,k)$ is the following:

$$Tm(t+1,k) - Tm(t,k) = (Vf(t+1,k) - Vf(t,k) - Vo(t+1,k) + Vo(t,k))/M(t,k) \quad (4)$$

The bases for the present invention are making the denominator of the right-hand side of equation (4) constant for all k values in an array and taking the measurements in quick enough succession that $M(t,k)$ is substantially the same as $M(t+1,k)$ for a measurement pair at t and t+1.

The preferred embodiment includes the same threshold level but differing initial sensor output levels, so that $(Vf(t+1,k) - Vf(t,k))$ equals zero and $(Vo(t+1,k) - Vo(t,k))$ does not equal zero. Note that knowledge of the actual values of $Vf(t+1,k)$, $Vf(t,k)$, $Vo(t+1,k)$, or $Vo(t,k)$ are not required for any k value, only the values of the differences.

With the preferred embodiment of the invention in an array of sensors, the threshold levels for different sensors need not be precisely matched, and the initial sensor output values for different sensors can be provided by a shared reference source.

Description—Graphical Motivation

Figure 3:
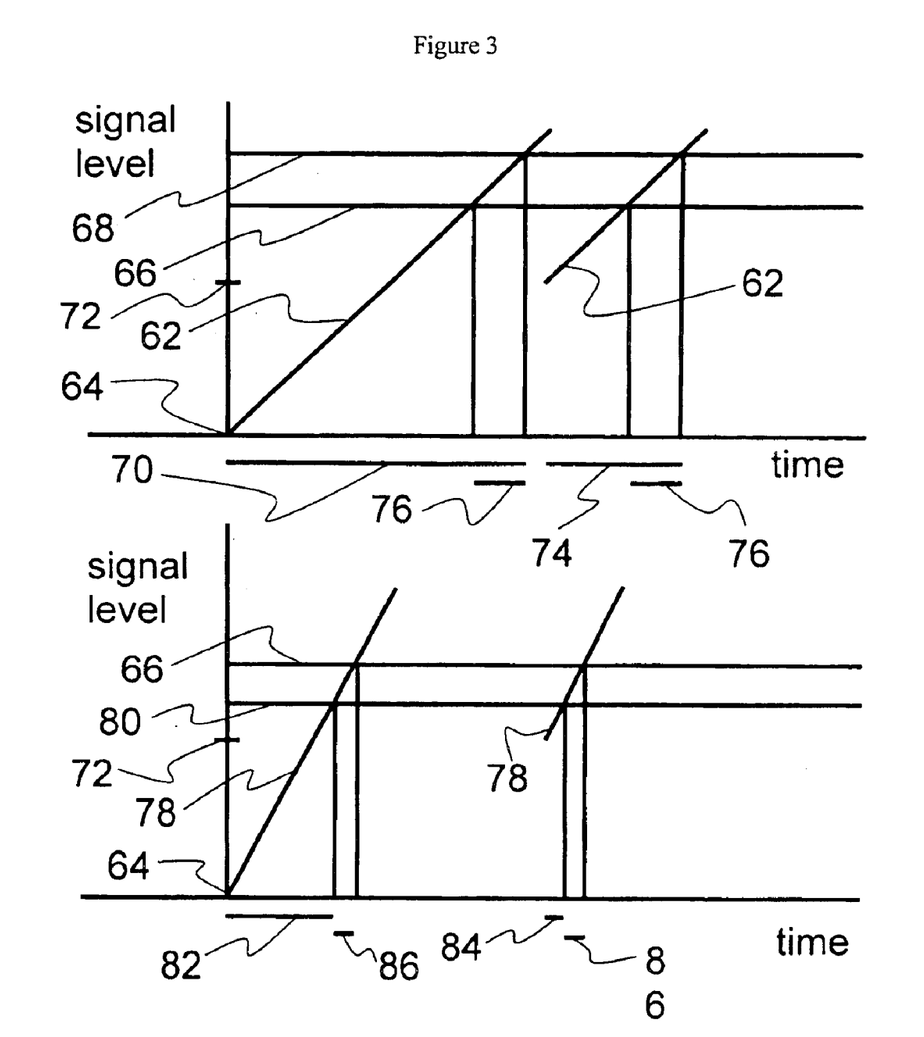
FIG. 3 shows a graphical depiction of time-to-threshold A/D conversion with FPN due to component mismatch and with input-dependent time-delay errors.

FIG. 3 illustrates a pair of signal measurements according to the preferred embodiment for two sensors. Both traces show time on the x-axis and signal level on the y-axis. The sensor output signal changes are shown as linearly-increasing functions to emphasize the temporal constancy of the incident energy during measurement and the approximate integrating nature of the sensors. Note that in practical systems, the sensor response may be a weighted integral (e.g. due to voltage-dependent capacitance across a photodiode, for instance) subject to noise (thermal or otherwise).

The upper trace shows the first sensor output level 62. During the first measurement, it begins at first initial signal level 64 and progresses to nominal threshold level 66, at which point a corresponding threshold detector should provide a digital indicator signal to trigger recording of a first elapsed time measurement. However, due to manufacturing variations, the threshold detector does not trigger until a first actual threshold level 68 is reached, at which point first sensor first elapsed time 70 is recorded. First sensor first elapsed time 70 is shown with a separate bar below the upper graph.

During the second measurement, which occurs immediately after the first measurement, first sensor output level 62 is reset to second initial signal level 72, which is not the same as first initial signal level 64. A first sensor second elapsed time 74, shown with a separate bar below the upper graph, is recorded.

Both first sensor first elapsed time 70 and first sensor second elapsed time 74 include a first delay term 76 whose duration is indicated with a separate bar. First delay term 76 is a function of both the rate-of-change of first sensor output level 62 during the measurements and the threshold level offset error associated with the first sensor's threshold detector.

The lower graph shows simultaneous first and second measurements for a second sensor. During the first measurement cycle, second sensor output level 78 begins at first initial signal level 64 and increases toward nominal threshold level 66. However, the second threshold detector also has threshold level error, and triggers when second output level 78 crosses second actual threshold level 80. The resulting second sensor first elapsed time 82 is shown as a separate bar beneath the graph.

During the second measurement cycle, second sensor output level 78 begins at second initial signal level 72 and increases toward nominal threshold level 66, with count recording triggered when it crosses second actual threshold level 80. The second sensor second elapsed time 84 is shown as a separate bar beneath the graph.

The two elapsed-time measurements for the second sensor each have a second delay term 86 shown as a separate bar beneath the graph. Second delay term 86 is dependent on the input strength and the offset error of the second sensor's threshold detector. As depicted, the offset error results in a negative time delay (i.e. time omitted rather than extra time).

Considering both traces together, we see that the incident energy at the second sensor during the first and second measurements causes a greater relative change than the incident energy at the first sensor. Each sensor's threshold detector has a different threshold level error, which contributes along with the differing amounts of incident energy to differing time measurement errors. However, the errors for a given sensor and threshold detector pair are repeated, and so can be removed by subtracting the appropriate measurements.

Figure 1B:
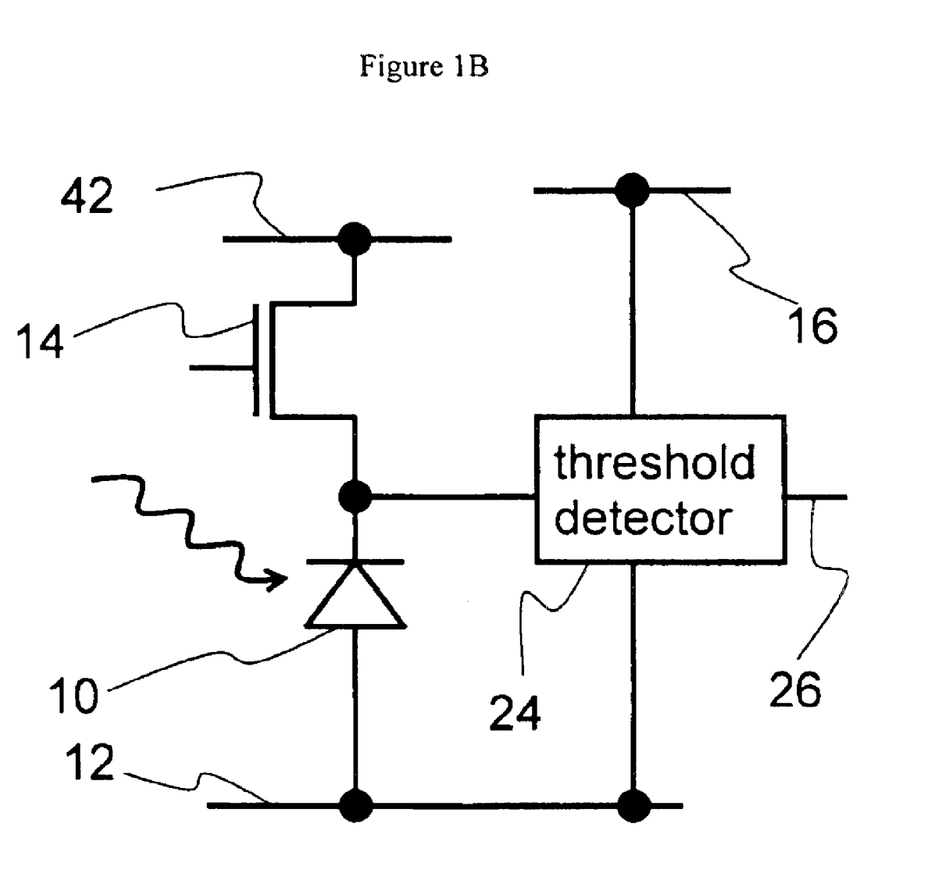
FIG. 1B shows a schematic of a prior art CMOS sensor with a local threshold detector enabling time-to-threshold A/D conversion, modified to include separate power supply and reset voltage buses.
Figure 2A:
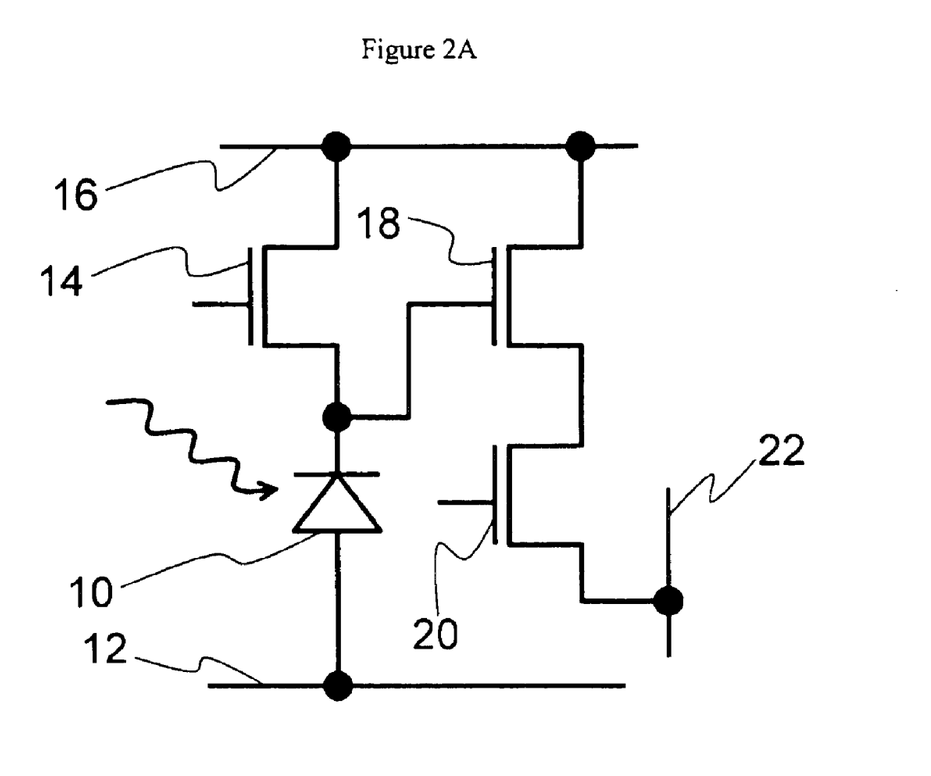
FIG. 2A shows a schematic of a prior art 3-transistor CMOS active pixel sensor.
Figure 2B:
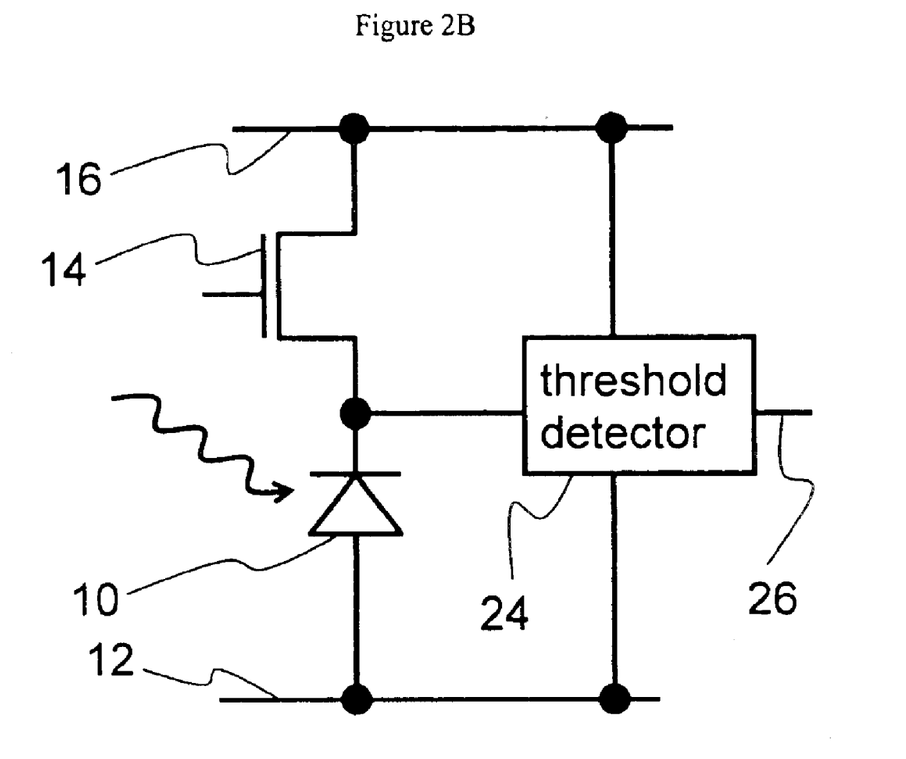
FIG. 2B shows a schematic of a prior art CMOS sensor with a local threshold detector included to enable time-to-threshold A/D conversion.

Description—A Circuit for the Preferred Embodiment with a Single Variable Reset Reference Bus FIG. 1B shows portions of a sensor cell for realizing the preferred embodiment of the invention. The main distinction between this sensor cell and that of FIG. 2B is that reset transistor 14 is attached to reference reset voltage bus 42, which is not the same wire as positive power supply rail 16. Threshold detector 24 and other digital logic that may be in the cell are connected to positive power supply rail 16.

During a first measurement cycle, a first reference value can be applied to reference reset voltage bus 42 by a reference source located outside of the sensor cell and outside the array. During a second measurement cycle, a second reference value can be applied to reference reset voltage bus 42.

There are two important costs associated with the circuit of FIG. 1B used as described above. One is the requirement of an additional wire running to each sensor cell in an array, and the other is the requirement for two different reset reference values.

In the case that multiple reference voltages are costly to generate, it is suggested that one of the reset reference values be identical to the voltage of the positive power supply rail. Then only a single additional reference voltage value is needed.

Description—Simultaneous Variation of Initial Sensor Output Values and Threshold Levels It is possible to use the prior art circuits of FIG. 2B in an alternative embodiment of the invention that does not require the extra wire discussed with respect to FIG. 1B.

By varying the voltage between positive power supply rail 16 and power supply ground 12 in FIG. 2B between measurements, it is possible to change both the reference voltages used to set the initial sensor output levels and the threshold levels of threshold detector 24.

There are a number of disadvantages to this approach. One is that the power supplies of digital logic elements are changing, so that logic levels and other features such as noise margin are variable. Power consumption is increased. Also, with reference to equation (4), this approach results in changes to each of Vf(t+1,k), Vf(t,k), Vo(t,k) and Vo(t+1,k), but it is not clear that the right-hand side denominator (Vf(t+1,k)−Vf(t,k)−Vo(t,k)+Vo(t+1,k)) of equation (4) will be the same for each k (i.e. for each sensor in the array).

Description—Fixed Initial Sensor Output Values and Variable Threshold Levels

The same disadvantage plagues alternative embodiments in which, referring to the circuit of FIG. 1B, positive power supply rail 16 has differing values for a pair of measurements while reference reset voltage bus 42 is constant. Then, Vo(t,k) and Vo(t+1,k) are equal for each k at a pair of time epochs t and (t+1), while Vf(t,k) and Vf(t+1,k) are not equal. However, it is quite possible that (Vf(t+1,k)−Vf(t,k)) is not the same for all k, since the threshold levels of each threshold detector are non-linear functions of physical circuit structures. In other words, threshold changes induced by a small power supply change may not be the same for all threshold detectors.

Description—Switched Reset Reference Buses

In an alternative embodiment, two fixed power supply and two fixed reference wires, or two fixed power supply and one fixed reference wire can pass into an array. Within each cell in the array, transistors or switches can selectively connect power and/or reset reference buses to the sensor cell circuits.

Of course, additional switch control wires would be needed. However, it may be the case that long power or reference bus wires with variable signal levels are not desired due to parasitic capacitance, power consumption, or other issues.

Description—Other Alternative Embodiments

In another alternative embodiment, a threshold detector alone has a variable power supply voltage. The sensor and digital logic can use shared fixed voltages. This has the effect of varying the threshold level without causing problems for other in-cell digital logic. However, it retains the drawbacks of an extra bus wire providing power to the threshold detector and the possible failure to achieve matched threshold level changes across the array.

Overall, the best approach seems to be to vary the initial sensor output levels rather than the threshold levels. It is possible to make a common reference source for initializing all the sensors in an array. Differences in the actual reference initialization signals at individual sensors, for instance, voltage sag over a long wire, are likely to be repeatable errors when the same signal path is used for the successive absolute measurements that are components of the differential measurement.

Description—Shared and Dedicated Components

In digital imaging array design there are numerous trade-offs among speed, size, power consumption, and other factors. In the prior art typified by the circuit in FIG. 2A, control wires and output bus wires are shared among sensor cells, allowing a regular cell structure with relatively few wires carrying signals into or out of the array. Of course, each sensor cell requires a switch (e.g. bus access transistor 20 in FIG. 2A) to access shared output wires. However, the cost of this switch in terms of space in each cell and wires for controlling it is very small.

FIG. 2B shows circuits for a CMOS image sensor with a local threshold detector suitable for time-to-threshold A/D conversion. The amplifying transistor 18 of FIG. 2A has been replaced with threshold detector 24 having digital indicator output 26. If it is small and simple, threshold detector 24 can be a local circuit which is not shared among multiple sensors. Suitable circuits are the subject of related application COMPARING CIRCUITS FOR TIME-TO-THRESHOLD A/D CONVERSION IN DIGITAL IMAGING ARRAYS and so are not discussed further here.

Note that in FIG. 2B, threshold detector 24 is shown with power connections to positive power supply rail 16 and to power supply ground 12.

With the preferred embodiment of the invention as shown in FIG. 1A in an imaging array, it is recommended that initialization reference 32 and elapsed time counter 38 be components shared among multiple sensor cells. For instance, both can be located outside of the array, with reference and count signals passed into the array on bus wires. On the other hand, it is recommended that threshold detector 30, first digital memory 34, and second digital memory 36 be components dedicated to one sensor cell, and moreover located within the cell.

In other words, it seems most efficient to pass the array control signals, power wires, digital count signals, and analog reference signals into the array from outside it, but to conduct threshold detection and count recording—both of which are time-critical processes—locally in the array.

Subtraction and then transfer of the results out of the array is not as time-critical. Subtractor 40 could be a dedicated circuit rather than a shared circuit. Alternatively, transfer of the recorded counts out of the array followed by subtraction might be useful, with subtractor 40 being either a dedicated or a shared circuit.

When the time between one pair of measurement cycles for one digital image and another pair of measurement cycles for the next digital image is relatively long, the same bus lines that transfer digital count signals into an array can be used to transfer recorded counts or difference results out of the array.

Incorporation of digital logic circuit elements into sensor cells is aided by advances in manufacturing processes. This benefit is available even if purely analog components cannot be reduced in size at the same rate (e.g. halving the lambda value in a CMOS process may not mean one can make good photodiodes with dimensions reduced by half). In fact, it may be beneficial to maintain or increase sensor cell size to allow more room for the various digital circuits—memory, arithmetic, counting—discussed above.

Description—Design Guidelines

The present invention allows high-precision digital image acquisition using devices that are relatively poorly matched.

Many sensor arrays, particularly CMOS image sensor arrays, have large numbers of sensor elements—millions or tens of millions, in fact. A "better" sensor array often entails having more sensors, which is often enabled by making sensor elements smaller.

Design procedures focus on crafting one sensor cell to desired specifications of size. The cell is then replicated as many times as needed to form the array, and the cells are wired together appropriately.

In CMOS image sensor systems, the threshold detectors discussed in the context of the present invention are circuits manufactured on a chip. They take up space and consume power. The threshold levels themselves depend on absolute and relative device dimensions, power supply voltages, and other physical parameters.

Given the demand for smaller sensor cells, the following structure for the present invention is recommended.

Threshold detector circuitry should be designed to be small. For instance, transistor-based threshold detectors could use minimum size transistors. This results in the greatest amount of mismatch, since a small absolute dimension error is then a large relative error.

With small devices for threshold detectors, the threshold levels may be far from available power supply voltage references. Hence, it is recommended that the preferred embodiment with repeated threshold levels but changed initial sensor output levels be used.

There should be at least two initial sensor output levels generated by a source outside the array and passed on a shared bus to the various sensor cells in the array. These two initial sensor output levels should be selected with the threshold levels and sensor response in expected conditions taken into consideration. The expected conditions include time of exposure and amount of incident energy.

If the initial sensor output levels are too far from the threshold level, sensor outputs will never trigger count recording, and so no information is provided by the sensors. On the other hand, if initial sensor levels are too close to the threshold level, sensor outputs will quickly trigger count recording and there won't be a great deal of dynamic range in the differential measurement.

As mentioned in U.S. Pat. No. 6,559,788, a variable-rate counter allows conversion of desired precision over a range of exposure intervals. For instance, in low-light conditions a long exposure time with a slow counter might be useful, while in bright conditions a shorter exposure time with a faster count might be useful.

Similarly, a multilevel reference source such as a multi-bit digital-to-analog converter might enable extremely flexible embodiments of the present invention. Based on analysis of some preliminary measurement of incident energy conditions, a desired pair of initial sensor output levels can be selected for a given differential image. This could be done in conjunction with selection of exposure time and count speed.

Figure 4:
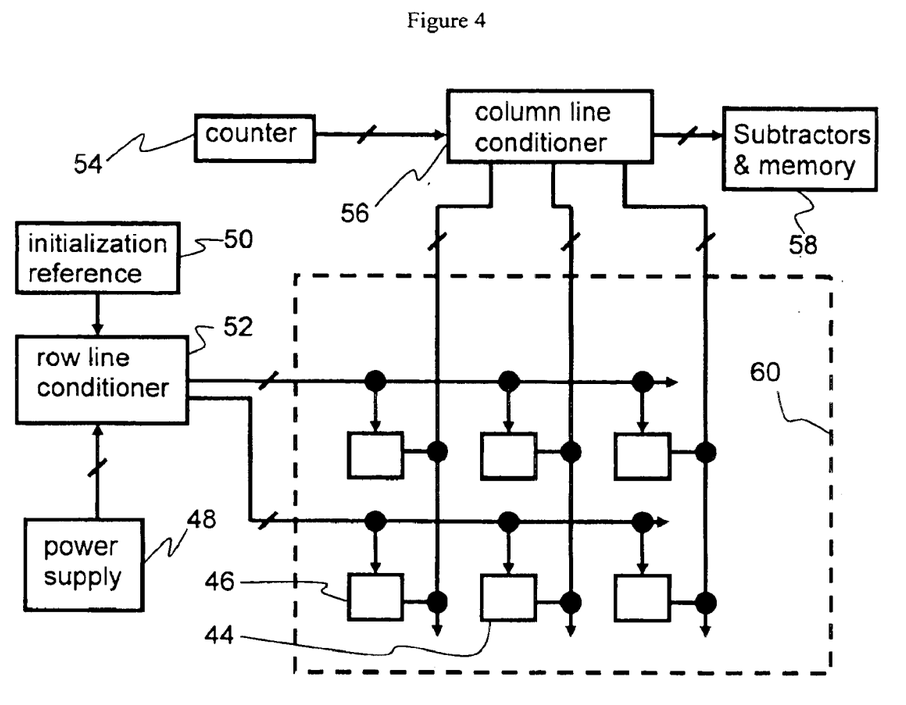
FIG. 4 shows an array structure with external sensor initialization reference generator, counter, and subtractor, and sensor cells with internal digital memories for count recording.

FIG. 4 illustrates a useful array architecture based on the guidelines above.

In FIG. 4, a first sensor cell 44 and a second sensor cell 46 are located within an array having outer array boundary 60. Reference source 50 provides initial sensor output reference levels to a row line conditioner 52. Also, power supply 48 provides positive and ground power levels to row line conditioner 52.

Row line conditioner 52, in turn, provides a set of shared power supply and sensor initialization reference buses going across the array, as well as additional control lines. Row line conditioner 52 provides suitable signal buffers since there are likely to be large numbers of sensor cells in practical arrays.

Counter 54 provides a digital count sequence to a column line conditioner 56, which provides a set of shared digital bus lines running along column of sensor cells. Column line conditioner 56 also provides a set of bus lines to an array-external block of subtractors and memory 58.

In operation, power supply, sensor output reference, and row control signals are passed into the array by row, while digital count values tracking elapsed time are passed into the array by column. First sensor cell 44 and second sensor cell 46 latch on to given count values when cell-internal threshold detectors indicate threshold has been reached. This implies at least one digital memory circuit in each cell.

In one alternative embodiment, after a first measurement the recorded count values are passed out on the column-shared bus lines to column line conditioner 56 and from there to the subtractors and memory 58. This avoids the cost of having separate digital count input and output lines and the cost of a second cell-internal memory circuit. On the other hand, it does introduce delay between completion of the first measurement cycle and commencement of the second measurement cycle.

In another alternative embodiment, first sensor cell 44 and second sensor cell 46 each have a pair of memory circuits. During the first measurement cycle, an elapsed time count is stored in one memory circuit, and during the second measurement cycle, an elapsed time count is stored in the other memory circuit. After the second measurement cycle, the recorded count pairs for each sensor are passed out of the array through the shared bus lines to column conditioner 56 and from there to subtractors and memory 58 for computation of the desired differential measurements.

CONCLUSION, RAMIFICATIONS, AND SCOPE

The reader will see that the present invention has several advantages over prior art techniques. Using the present invention, it is possible to implement high-precision massively-parallel A/D conversion of sensor outputs from a sensor array without precise component matching. Repeatable errors are corrected using a differential measurement.

First and second time-to-threshold measurements are taken in quick succession. The initial sensor output values or the desired thresholds are different, so that the measured elapsed times are different. Otherwise, the repeatable error conditions are preserved, as the same sensor and threshold detection circuit are used in both measurements. Computing the difference between the two measurements removes any errors common to both.

Conversion circuitry that is not shared among multiple sensors can be very simple, so that it can be included in close physical proximity to the sensors themselves, even within the array for certain technologies. Also, the non-shared conversion circuitry can be designed for a single sensor, with sensor and non-shared circuitry replicated to make an array of desired size.

The invention is particularly useful in CMOS image sensor technologies, wherein it is possible to manufacture both sensors and conversion circuitry simultaneously on a single chip. CMOS manufacturing tolerances for the mixed-signal elements of the invention are well understood but costly to match to very high precision.

The description above contains many specific details relating to sensors, A/D conversions, precision, exposure times, incident energy, array sizes, array geometries, circuit design, threshold levels, and applications. These should not be construed as limiting the scope of the invention, but as illustrating some of the presently preferred embodiments of the invention. The scope of the invention should be determined by the appended claims and their legal equivalents, rather than by the examples given.

I claim:

1. A method for differential elapsed-time analog-to-digital conversion, comprising:
   a. initializing an output of a first sensor to a first initial output level
   b. allowing said output of said first sensor to change from said first initial output level in response to incident energy
   c. measuring a first elapsed time required for said output of said first sensor to change from said first initial output level to a first threshold level
   d. initializing said output of said first sensor to a second initial output level
   e. allowing said output of said first sensor to change from said second initial output level in response to incident energy
   f. measuring a second elapsed time required for said output of said first sensor to change from said second initial output level to a second threshold level
   g. combining said first elapsed time and said second elapsed time whereby in conditions of substantially constant incident energy said first elapsed time and said second elapsed time are functions of said first initial output level, said first threshold level, said second initial output level, and said second threshold level.

2. The method of claim 1 in which said first threshold level is substantially the same as said second threshold level.

3. The method of claim 2 in which said first initial output level is different from said second initial output level.

4. The method of claim 3 in which said combining comprises computing a difference time between said first elapsed time and said second elapsed time, whereby said difference time does not require precise knowledge of said first threshold level and said second threshold level.

5. The method of claim 1 in which said first initial output level is substantially the same as said second initial output level.

6. The method of claim 5 in which said first threshold level is not the same as said second threshold level.

7. The method of claim 6 in which said combining comprises computing a difference time between said first elapsed time and said second elapsed time, whereby said difference time does not require precise knowledge of said first initial output level and said second initial output level.

8. The method of claim 1 further including:
   a. initializing an output of a second sensor to a third initial output level
   b. allowing said output of said second sensor to change from said third initial output level in response to incident energy
   c. measuring a third elapsed time required for said output of said second sensor to change from said third initial output level to a third threshold level
   d. initializing said output of said second sensor to a fourth initial output level
   e. allowing said output of said second sensor to change from said fourth initial output level in response to incident energy
   f. measuring a fourth elapsed time required for said output of said second sensor to change from said second initial output level to a second threshold level
   g. combining said third elapsed time and said fourth elapsed time.

9. The method of claim 8 in which:
   a. said third initial output level is substantially the same as said fourth initial output level
   b. said third initial output level is substantially the same as said first initial output level.

10. The method of claim 8 in which:
    a. said allowing of said change from said first initial output level is substantially simultaneous with said allowing of said change from said third initial output level
    b. said allowing of said change from said second initial output level is substantially simultaneous with said allowing of said change from said fourth output level
    whereby elapsed time measurements for two sensors are made substantially simultaneously.

11. A machine used for differential elapsed-time analog-to-digital conversion, comprising:
    a. means for initializing an output of a first sensor to a first initial output level
    b. means for allowing said output of said first sensor to change from said first initial output level in response to incident energy
    c. means for measuring a first elapsed time required for said output of said first sensor to change from said first initial output level to a first threshold level
    d. means for initializing said output of said first sensor to a second initial output level
    e. means for allowing said output of said first sensor to change from said second initial output level in response to incident energy
    f. means for measuring a second elapsed time required for said output of said first sensor to change from said second initial output level to a second threshold level
    g. means for combining said first elapsed time and said second elapsed time
    whereby in conditions of substantially constant incident energy said first elapsed time and said second elapsed time are functions of said first initial output level, said first threshold level, said second initial output level, and said second threshold level.

12. The machine of claim 11 in which said first threshold level is substantially the same as said second threshold level.

13. The machine of claim 12 in which said first initial output level is different from said second initial output level.

14. The machine of claim 13 in which said means for said combining comprises means for computing a difference time between said first elapsed time and said second elapsed time, whereby said difference time does not require precise knowledge of said first threshold level and said second threshold level.

15. The machine of claim 11 in which said first initial output level is substantially the same as said second initial output level.

16. The machine of claim 15 in which said first threshold level is not the same as said second threshold level.

17. The machine of claim 16 in which said means for said combining comprises means for computing a difference time between said first elapsed time and said second elapsed time, whereby said difference time does not require precise knowledge of said first initial output level and said second initial output level.

18. The machine of claim 11 further including:
   a. means for initializing an output of a second sensor to a third initial output level
   b. means for allowing said output of said second sensor to change from said third initial output level in response to incident energy
   c. means for measuring a third elapsed time required for said output of said second sensor to change from said third initial output level to a third threshold level
   d. means for initializing said output of said second sensor to a fourth initial output level
   e. means for allowing said output of said second sensor to change from said fourth initial output level in response to incident energy
   f. means for measuring a fourth elapsed time required for said output of said second sensor to change from said second initial output level to a second threshold level
   g. means for combining said third elapsed time and said fourth elapsed time.

19. The machine of claim 18 in which:
   a. said third initial output level is substantially the same as said fourth initial output level
   b. said third initial output level is substantially the same as said first initial output level.

20. The machine of claim 18 in which:
   a. said means for said allowing of said change from said first initial output level is substantially simultaneous with said allowing of said change from said third initial output level
   b. said means for said allowing of said change from said second initial output level is substantially simultaneous with said allowing of said change from said fourth output level
   whereby elapsed time measurements for two sensors are made substantially simultaneously.

21. A method for differential elapsed-time analog-to-digital conversion in a digital imaging system, comprising:
   a. initializing an output of a first sensor to a first initial output level
   b. allowing said output of said first sensor to change from said first initial output level in response to incident energy
   c. measuring a first elapsed time required for said output of said first sensor to change from said first initial output level to a first threshold level
   d. initializing said output of said first sensor to a second initial output level
   e. allowing said output of said first sensor to change from said second initial output level in response to incident energy
   f. measuring a second elapsed time required for said output of said first sensor to change from said second initial output level to a second threshold level
   whereby in conditions of substantially constant incident energy said first elapsed time and said second elapsed time are functions of said first initial output level, said first threshold level, said second initial output level, and said second threshold level.

22. A machine used for differential elapsed-time analog-to-digital conversion in a digital imaging system, comprising:
   a. means for initializing an output of a first sensor to a first initial output level
   b. means for allowing said output of said first sensor to change from said first initial output level in response to incident energy
   c. means for measuring a first elapsed time required for said output of said first sensor to change from said first initial output level to a first threshold level
   d. means for initializing said output of said first sensor to a second initial output level
   e. means for allowing said output of said first sensor to change from said second initial output level in response to incident energy
   f. means for measuring a second elapsed time required for said output of said first sensor to change from said second initial output level to a second threshold level
   whereby in conditions of substantially constant incident energy said first elapsed time and said second elapsed time are functions of said first initial output level, said first threshold level, said second initial output level, and said second threshold level.

* * * * *